Patented June 27, 1944

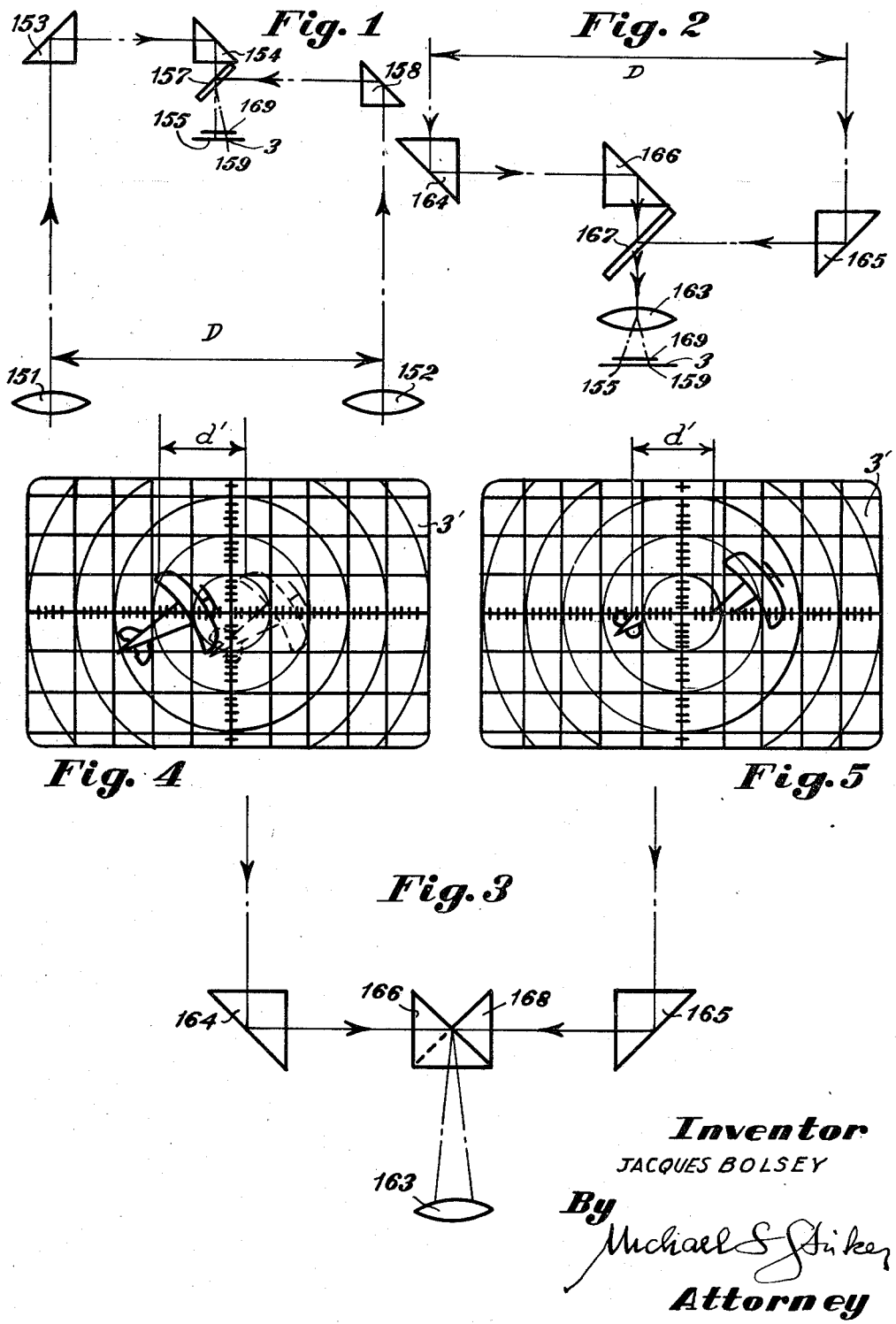

2,352,176

UNITED STATES PATENT OFFICE 2,352,176

PHOTOGRAPHIC ARRANGEMENT

Jacques Bogopolsky, New York, N. Y., now by judicial change of name Jacques Bolsey Application February 24, 1940, Serial No. 320,706
In France January 25, 1939

7 Claims. (Cl. 95—18)

My invention relates to photographic arrangements for determining the distance of an object from this arrangement.

It is the object of the present invention to provide simple and accurate means for determining this distance.

Other objects of the invention will be stated in the annexed description and drawing which illustrates perferred embodiments thereof.

In the drawing:

Figures 1-3 are diagrammatic views of the photographic arrangement for determining the distance of an object from this arrangement; and Figures 4 and 5 are images made in accordance with the present invention for determining the distance of a photographed airplane from the photographic arrangement with which these images are made.

In order to determine the distance between the photographic arrangement and the photographed object the arrangement comprises two main photographic means spaced apart from each other for recording two images of the object on a light sensitive photographic material. The arrangement furthermore comprises in accordance with the present invention auxiliary photographic means adapted to record on said light sensitive photographic material also scale lines spaced at a distance having a known relation to the distance between the photographic object and the photographic arrangement; in this way the latter distance, namely the distance between the object and the photographic arrangement can be measured by counting the number of scale lines between corresponding points of the two recorded images of the object the distance of which has to be determined.

An embodiment of such an arrangement is shown diagrammatically in Fig. 1, in which a pair of lenses or tele-objectives 151 and 152 are disposed parallel to each other and spaced by a distance D. This distance D constitutes the telemetric base. The image of the lens 151 is deflected to the right and projected on each frame of the film at 155 by means of the prisms 153 and 154. The image of the lens 152 is deflected to the left and projected on the same frame at 159 by means of a prism 158 and a stainless semi-transparent mirror 157.

In the modification of this photographic arrangement shown in Fig. 2, a single lens or objective 163 is used. The telemetric distance D, in that case, is determined by the space between two prisms 164 and 165, which deflect the two images to each frame of the film at 155 and 159 respectively, through a prism 166 and a semi-silvered mirror 167.

In the modification shown in Fig. 3 the telemetric distance D is equal to the distance between the prisms 164 and 165 which deflect the two images to each frame of the film. In order to obtain two half images which are shifted and juxtaposed the two optical axes are shifted vertically and the second prism 168 is superimposed on the prism 166.

The above mentioned scale lines which are recorded in accordance with the present invention on the light sensitive photographic material simultaneously with the images of the object are obtained by means of a transparent reticle 169 fixed just in front of the film. The scale lines are marked permanently and opaquely on this reticle. As shown in Figs. 4 and 5 this reticle is preferably composed of straight parallel scale lines extending in direction at an angle to the plane defined by the optical axes of lenses 151 and 152 and concentric circular scale lines. These parallel straight scale lines might be, as shown, normal to the plane defined by these lens axes. In view of the fact that such transparent reticles are widely used and well known to everybody skilled in this art, a detailed view of this reticle itself seems unnecessary.

Fig. 4 shows a double or stereoscopic image of an airplane recorded on a frame 3' of the film by means of the photographic arrangement of Fig. 1 or Fig. 2. This double image shows the same airplane in two different respective positions. The distance $d'$ between these positions (given by reading the distance between the same point of the plane in the two positions by means of a magnifying glass or of magnified projection) gives the distance between the photographic arrangement and the plane in function of the telemetric base D and of the focal lengths of the lenses 151, 152 or 163.

In Fig. 5, the stereoscopic image consists of two half-images, which are shifted and juxtaposed so as to facilitate the reading of the distance $d'$. In order to obtain these two half-images, the two optical axes are shifted vertically and a second prism 168 (Fig. 3) superimposed on the prism 166, as described above in connection with Fig. 3.

Referring to Fig. 1, the camera lenses 151 and 152 have spaced and parallel optical axes, as indicated by the parallel lines between the centers of said lenses and the prisms 153 and 158. The prisms 164 and 165 of Fig. 3, in effect also provide two optical systems which have spaced and parallel optical axes, and which are recorded by the common camera lens 163.

The photographic arrangement which is shown in Fig. 3 for example, makes it possible accurately to determine the distance of an object from the photographic arrangement. As shown in Figs. 4 and 5, separate images of the target are photographically recorded. The straight scale lines and the circular scale lines which are shown in Figs. 4 and 5 are photographed on each frame, by using a suitable reticle shown in Figs. 1 and 2. These scale lines are made according to a suitable scale. Since the telemetric distance between the prisms of the camera is known, the spacing of the photographs of the object in the frames makes it possible readily and accurately to determine the distance of the object from the camera, with a lens system of known focal length.

I claim:

1. A photographic arrangement for determining the distance of an object from said arrangement comprising two main photographic means for recording two images of said object on a light-sensitive photographic material, said photographic means having spaced parallel optical axes and including light deflecting means arranged in such a manner that said images of said object are recorded in a single image field on said light-sensitive photographic material, and auxiliary photographic means adapted to record on said image field of said light-sensitive photographic material also scale lines extending in a direction at an angle to the plane defined by said axes and spaced at a distance having a known relation to the distance between said object and said photographic arrangement, whereby the latter distance can be measured by counting the number of scale lines between corresponding points on said two images of said object.

2. A photographic arrangement for determining the distance of an object from said arrangement comprising two main photographic means for recording two images of said object on a light-sensitive photographic material, said photographic means having spaced parallel optical axes and including light deflecting means arranged in such a manner that said images of said object are recorded superposed upon each other in a single image field on said light-sensitive photographic material, and auxiliary photographic means adapted to record on said image field of said light-sensitive photographic material also scale lines extending in a direction at right angles to the plane defined by said axes and spaced at a distance having a known relation to the distance between said object and said photographic arrangement, whereby the latter distance can be measured by counting the number of scale lines between corresponding points on said two images of said object.

3. A photographic arrangement for determining the distance of an object from said arrangement comprising two main photographic means for recording two complementary half images of said object on a light-sensitive photographic material, said photographic means having spaced parallel optical axes and including light deflecting means arranged in such a manner that said complementary half images of said object are recorded side by side in a single image field on said light-sensitive photographic material, and auxiliary photographic means adapted to record on said image field of said light-sensitive photographic material also scale lines extending in a direction at an angle to the plane defined by said axes and spaced at a distance having a known relation to the distance between said object and said photographic arrangement, whereby the latter distance can be measured by counting the number of scale lines between corresponding points on said two complementary half images of said object.

4. A photographic arrangement for determining the distance of an object from said arrangement comprising two main photographic means for recording two images of said object on a light-sensitive photographic material, said photographic means having spaced parallel optical axes and including light deflecting means arranged in such a manner that such images of said object are recorded in a single image field on said light-sensitive photographic material, and auxiliary photographic means adapted to record on said image field of said light-sensitive photographic material also straight parallel scale lines extending in direction at an angle to the plane defined by said axes and concentric circular scale lines, said scale lines being spaced at a distance having a known relation to the distance between said object and said photographic arrangement, whereby the latter distance can be measured by counting the number of scale lines between corresponding points on said two images of said object.

5. A photographic arrangement for determining the distance of an object from said arrangement comprising two main photographic means spaced apart from each other for recording two images of said object on a light-sensitive photographic material, and auxiliary photographic means adapted to record on said light-sensitive photographic material also scale lines spaced at a distance having a known relation to the distance between said object and said photographic arrangement, whereby the latter distance can be measured by counting the number of scale lines between corresponding points on said two images of said object.

6. An arrangement for determining the distance of an object from said arrangement comprising two main optical means for recording two images of said object on a light sensitive photographic material, said optical means having spaced optical axes and including light deflecting means arranged in such manner that said images of said object are recorded in a single image field on said light sensitive photographic material, and means adapted to record on said image field of said light sensitive photographic material also scale lines spaced at a distance having a known relation to the distance between said object and said arrangement, whereby the latter distance can be measured by counting the number of scale lines between corresponding points on said two images of said object.

7. A photographic arrangement for determining the distance of an object from said arrangement comprising two photographic means for recording two images of said object on a light sensitive photographic material, said photographic means having spaced parallel optical axes and including light deflecting means arranged in such a manner that said images of said object are recorded in a single image field on said light sensitive material, and means adapted to record on said image field of said light-sensitive photographic material also scale lines spaced at a distance having a known relation to the distance between said object and said photographic arrangement, whereby the latter distance can be measured by counting the number of scale lines between corresponding points of said two images of said object.

JACQUES BOGOPOLSKY.